(12) United States Patent
Kitada

(10) Patent No.: US 9,746,953 B2
(45) Date of Patent: Aug. 29, 2017

(54) TOUCH INPUT DEVICE

(71) Applicant: Murata Manufacturing Co., Ltd., Nagaokakyo-shi, Kyoto-fu (JP)

(72) Inventor: Hiroaki Kitada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 3 days.

(21) Appl. No.: 14/732,930

(22) Filed: Jun. 8, 2015

(65) Prior Publication Data

US 2015/0268786 A1 Sep. 24, 2015

Related U.S. Application Data

(63) Continuation of application No. PCT/JP2013/082926, filed on Dec. 9, 2013.

(30) Foreign Application Priority Data

Dec. 12, 2012 (JP) .................... 2012-270898

(51) Int. Cl.
*G06F 3/041* (2006.01)
*G06F 3/044* (2006.01)

(52) U.S. Cl.
CPC ............ *G06F 3/0414* (2013.01); *G06F 3/041* (2013.01); *G06F 3/044* (2013.01); *G06F 2203/0381* (2013.01); *G06F 2203/04105* (2013.01)

(58) Field of Classification Search
CPC ........ G06F 3/0414; G06F 3/041; G06F 3/044; G06F 3/016

USPC ......................................................... 345/173
See application file for complete search history.

(56) References Cited

U.S. PATENT DOCUMENTS

| 9,244,562 B1 * | 1/2016 | Rosenberg .......... G06F 3/04847 |
| 2004/0146193 A1 | 7/2004 | Imamura et al. |
| 2005/0110769 A1 | 5/2005 | DaCosta et al. |

(Continued)

FOREIGN PATENT DOCUMENTS

| JP | 2004-222776 A | 8/2004 |
| JP | 2007/512619 A | 5/2007 |

(Continued)

OTHER PUBLICATIONS

International Search Report issued for PCT/JP2013/082926, date of mailing Mar. 4, 2014.

(Continued)

*Primary Examiner* — Fred Tzeng
(74) *Attorney, Agent, or Firm* — Arent Fox LLP

(57) ABSTRACT

A touch input device has a touch sensor, an operation moving amount detection unit, a pressing force detection unit, and a control unit. The touch sensor has an electrostatic sensor, and a piezoelectric sensor, and outputs an operation position detection signal and a pressing sensing signal. The operation moving amount detection unit detects an operation moving amount from the operation position detection signal. The pressing force detection unit detects a pressing force from the pressing sensing signal. The control unit previously sets threshold value Th of the pressing force, and starts the drag operation when the pressing force is threshold value Th or more. Threshold value Th whose initial value is a maximum value is decreased with time.

16 Claims, 6 Drawing Sheets

(56) References Cited

U.S. PATENT DOCUMENTS

| | | | |
|---|---|---|---|
| 2010/0220065 A1* | 9/2010 | Ma | G06F 3/016 345/173 |
| 2011/0057903 A1* | 3/2011 | Yamano | G06F 3/0237 345/174 |
| 2011/0084910 A1* | 4/2011 | Almalki | G06F 3/016 345/173 |
| 2011/0141052 A1* | 6/2011 | Bernstein | G06F 3/016 345/174 |
| 2012/0068939 A1* | 3/2012 | Pemberton-Pigott | G06F 3/016 345/173 |
| 2012/0105358 A1* | 5/2012 | Momeyer | G06F 3/0414 345/174 |
| 2012/0193211 A1* | 8/2012 | Ciesla | G06F 3/0202 200/81 H |
| 2012/0306764 A1 | 12/2012 | Kamibeppu | |
| 2013/0307809 A1* | 11/2013 | Sudou | G06F 3/0414 345/173 |
| 2014/0253305 A1* | 9/2014 | Rosenberg | G06F 3/016 340/407.2 |
| 2014/0300569 A1* | 10/2014 | Matsuki | G06F 3/041 345/173 |
| 2014/0306927 A1* | 10/2014 | Kashiwagi | G06F 3/0414 345/174 |
| 2015/0002479 A1* | 1/2015 | Kawamura | G06F 3/0414 345/178 |
| 2015/0097791 A1* | 4/2015 | Lisseman | B62D 1/04 345/173 |
| 2016/0216824 A1* | 7/2016 | Kies | G06F 3/0416 |

FOREIGN PATENT DOCUMENTS

| | | |
|---|---|---|
| JP | 2011-128754 A | 6/2011 |
| JP | 2012-53926 A | 3/2012 |

OTHER PUBLICATIONS

Written Opinion of the International Searching Authority issued for PCT/JP2013/082926, dated Mar. 4, 2014.

* cited by examiner

TOUCH INPUT DEVICE

CROSS-REFERENCE TO RELATED APPLICATIONS

The present application is a continuation of PCT/JP2013/082926 filed Dec. 9, 2013, which claims priority to Japanese Patent Application No. 2012-270898, filed Dec. 12, 2012, the entire contents of each of which are incorporated herein by reference.

FIELD OF THE INVENTION

The present invention relates to a touch input device which executes a process according to a state in which an operation surface is touched.

BACKGROUND OF THE INVENTION

At present, various electronic devices having a planar touch sensor arranged on the front side of a display screen are being contrived. Such a touch sensor has, as an operation input function, a drag and drop function.

For instance, as illustrated in the electronic device of Patent Literature 1, the drag and drop function uses a pressing force onto the touch sensor.

The electronic device of Patent Literature 1 detects that a pressing force onto an operation surface is a threshold value or more, and selects the object assigned to the detection position. At detecting movement of the touch position with the pressing force detected, movement of the object is started. That is, the drag operation is started.

While the drag speed is a predetermined value or more, pressing force detection is stopped, and when the drag speed is less than the predetermined value, pressing force detection is started again. At detecting that the pressing force is less than the threshold value, the position of the object is determined. That is, the drop operation is performed.

Patent Literature 1: Japanese Patent Application Laid-Open (JP-A) No. 2012-53926

However, in the conventional structure and process, the following problems arise. FIG. 7 illustrates waveform graphs for explaining the problems of the conventional structure and process. FIG. 7 illustrates the time waveforms of the moving speed, the pressing force, and the touch detection flag in a detection position.

In selecting an object displayed on the operation surface with a finger, the operator who lightly touches the operation surface with the finger slowly moves the finger sometimes. In this case, the operator can unintentionally press the operation surface. For instance, as illustrated in the example in FIG. 7, even in the section in which the moving speed in the operation position is low, the pressing force becomes stronger.

After such pressing, as illustrated in FIG. 7, the pressing force is threshold value Thc or more, the touch detection flag is changed from Low to Hi to start the drag operation. This position is detection drag position Pd. However, for instance, as illustrated in FIG. 7, the operator often increases the moving speed of the finger in the operation position after the finger reaches target drag position Pp. Detection drag position Pd does not coincide with target drag position Pp, with the result that the non-target object is dragged.

When threshold value Thc is set sufficiently high, such an unintentional drag operation can be prevented. However, in this case, unless pressing exceeding threshold value Thc which is set high is performed, the drag operation cannot be started. Consequently, the operability is lowered.

SUMMARY OF THE INVENTION

An object of the present invention is to provide a touch input device which can prevent the drag operation from being erroneously operated without lowering the operability.

The present invention provides a touch input device including a pressing force detection unit detecting a pressing force onto an operation surface, and a control unit detecting that the pressing force is a predetermined threshold value or more and executing a particular process, in which the control unit sets the threshold value to a maximum value in initial state, and decreases the threshold value with time.

With this structure, the threshold value is set high when whether the drag operation or the preparation operation for the drag operation is performed is not clear. Thus, at this time, the drag operation can be prevented from being erroneously detected. For continuing the drag operation, a predetermined pressing force is continuously applied and is then the threshold value or more due to decrease in the threshold value with time, whereby the intended drag operation can thus be reliably detected.

The touch input device of the present invention preferably has the following structure. The control unit sets the final value of the threshold value to a predetermined value which is not zero, and maintains the final value after the threshold value reaches the final value.

With this structure, the minimum value of the threshold value is limited. Thus, the drag operation is not detected even when the operator simply continues to place the finger onto the operation surface without intending the drag operation.

The touch input device of the present invention preferably has the following structure. The touch input device includes a movement detection unit detecting movement of an operation position on the operation surface. The control unit sets the threshold value after detecting that movement of the operation position is started.

With this structure, unless movement of the operation position is detected, detection of the drag operation according to the pressing force and the threshold value is not preformed. Thus, the drag operation can be prevented more reliably from being erroneously detected.

The control unit of the touch input device of the present invention preferably starts to set the threshold value after a delay of a predetermined time from the timing at which the control unit detects that movement of the operation position is started.

With this structure, detection of the drag operation according to the pressing force and the threshold value is not performed in initial state in which whether the drag operation or the preparation operation for the drag operation is performed is not clear. Thus, the drag operation can be prevented more reliably from being erroneously detected.

The touch input device of the present invention may have the following structure. The control unit detects a moving speed from the moving distance of the operation position between a plurality of times, and changes the threshold value according to the moving speed.

The touch input device of the present invention may have the following structure. The touch input device includes a pressing force detection unit detecting a pressing force onto an operation surface, a control unit detecting that the pressing force is a predetermined threshold value or more and executing a particular process, and a movement detection unit detecting movement of an operation position on the operation surface. The control unit detects a moving speed from the moving distance of the operation position between a plurality of times, and changes the threshold value according to the moving speed.

With this structure, the threshold value is changed according to the moving speed, so that when the moving speed is low, the drag operation is difficult to be detected, and when the moving speed is high, the drag operation is easily detected. Thus, the drag operation can be prevented from being erroneously detected.

In the touch input device of the present invention, the control unit preferably decreases the threshold value as the moving speed becomes higher.

With this structure, when the moving speed is low, the drag operation is difficult to be detected, and when the moving speed is high, the drag operation is detected. Thus, the drag operation can be prevented from being erroneously detected.

According to the present invention, the drag operation can be prevented from being erroneously operated without lowering the operability.

DETAILED DESCRIPTION OF THE EXEMPLARY EMBODIMENTS

Figure 1:
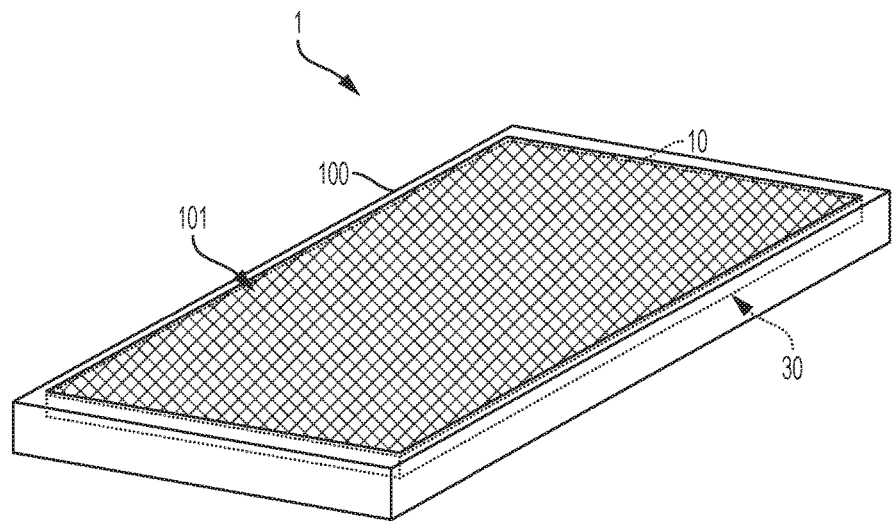
FIG. 1 is an appearance perspective view of a touch input device according to a first embodiment of the present invention.
Figure 2:
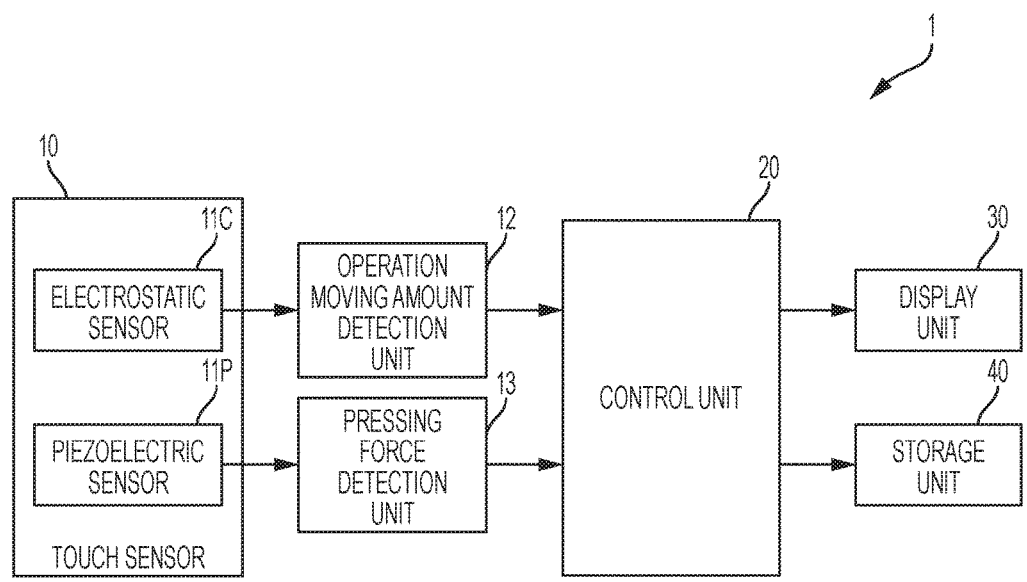
FIG. 2 is a block diagram of the touch input device according to the first embodiment of the present invention.

A touch input device according to a first embodiment of the present invention will be described with reference to the drawings. FIG. 1 is an appearance perspective view of the touch input device according to the first embodiment of the present invention. FIG. 2 is a block diagram of the touch input device according to the first embodiment of the present invention.

As illustrated in FIG. 1, a touch input device 1 has a substantially rectangular parallelepiped housing 100 of a portable size. The housing 100 is substantially planar in shape, its length and width being larger than its thickness. One planar surface (the surface orthogonal to the thickness direction) of the housing 100 is an operation surface 101.

A planar touch sensor 10 is arranged on substantially the entire operation surface 101. The touch sensor 10 is made of a material having light transmittance. Inside the housing 100 from the touch sensor 10, a display unit (display panel) 30 is arranged on substantially the entire surface of the housing 100. The display unit 30 is a thin display, e.g., a liquid crystal display.

As illustrated in FIG. 2, the touch input device 1 functionally has an operation moving amount detection unit 12, a pressing force detection unit 13, a control unit 20, and a storage unit 40, in addition to the touch sensor 10 and the display unit 30. The touch sensor 10 has an electrostatic sensor 11C, and a piezoelectric sensor 11P. The electrostatic sensor 11C and the operation moving amount detection unit 12 form the "movement detection unit" of the present invention. The piezoelectric sensor 11P and the pressing force detection unit 13 form the "pressing force detection unit" of the present invention.

The electrostatic sensor 11C is formed with electrostatic capacity detection electrodes on both principal planes of a dielectric substrate. The electrostatic sensor 11 detects the change in electrostatic capacity in the touching position of the operator's finger, and generates an operation position detection signal. The piezoelectric sensor 11P is formed with piezoelectric detection electrodes on both principal planes of a piezoelectric film. The piezoelectric sensor 11P detects electric charge generated when the finger of the operator presses the operation surface, and generates a pressing sensing signal.

The electrostatic sensor 11C inputs the operation position detection signal to the operation moving amount detection unit 12 at predetermined time intervals. The operation moving amount detection unit 12 detects an operation moving amount of the operation position inputted in a plurality of times. The operation moving amount detection unit 12 outputs the operation position and the operation moving amount to the control unit 20.

The pressing force detection unit 13 detects, from the amplitude level of the pressing sensing signal, a pressing force proportional to the amplitude level. The pressing force detection unit 13 outputs the pressing force to the control unit 20.

The control unit 20 performs the entire control for the touch input device 1, and executes a particular process with respect to operation input. The storage unit 40 stores programs for the control processes and threshold value Th of the pressing force. The control unit 20 reads the programs and threshold value Th stored in the storage unit 40, and executes the controls and processes. The storage unit 40 can be used as a computation memory at executing the controls and processes.

The operation moving amount and the pressing force are inputted to the control unit 20. The control unit 20 detects an operation start timing from the operation moving amount. The control unit 20 also detects an operation moving speed from the operation moving amount at a plurality of times.

The control unit 20 uses the pressing force, threshold value Th, and the operation start timing and the operation moving speed based on the operation moving amount, and executes the following drag and drop operation.

Figure 3:
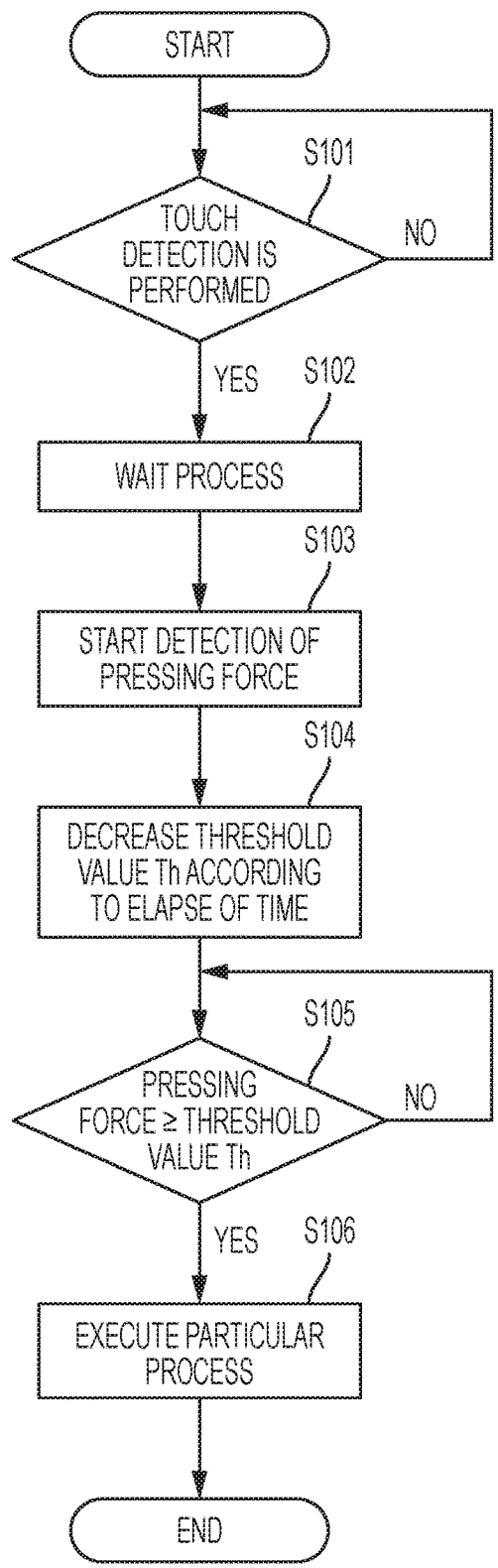
FIG. 3 is a flowchart of the drag and drop operation of the touch input device according to the first embodiment of the present invention.
Figure 4:
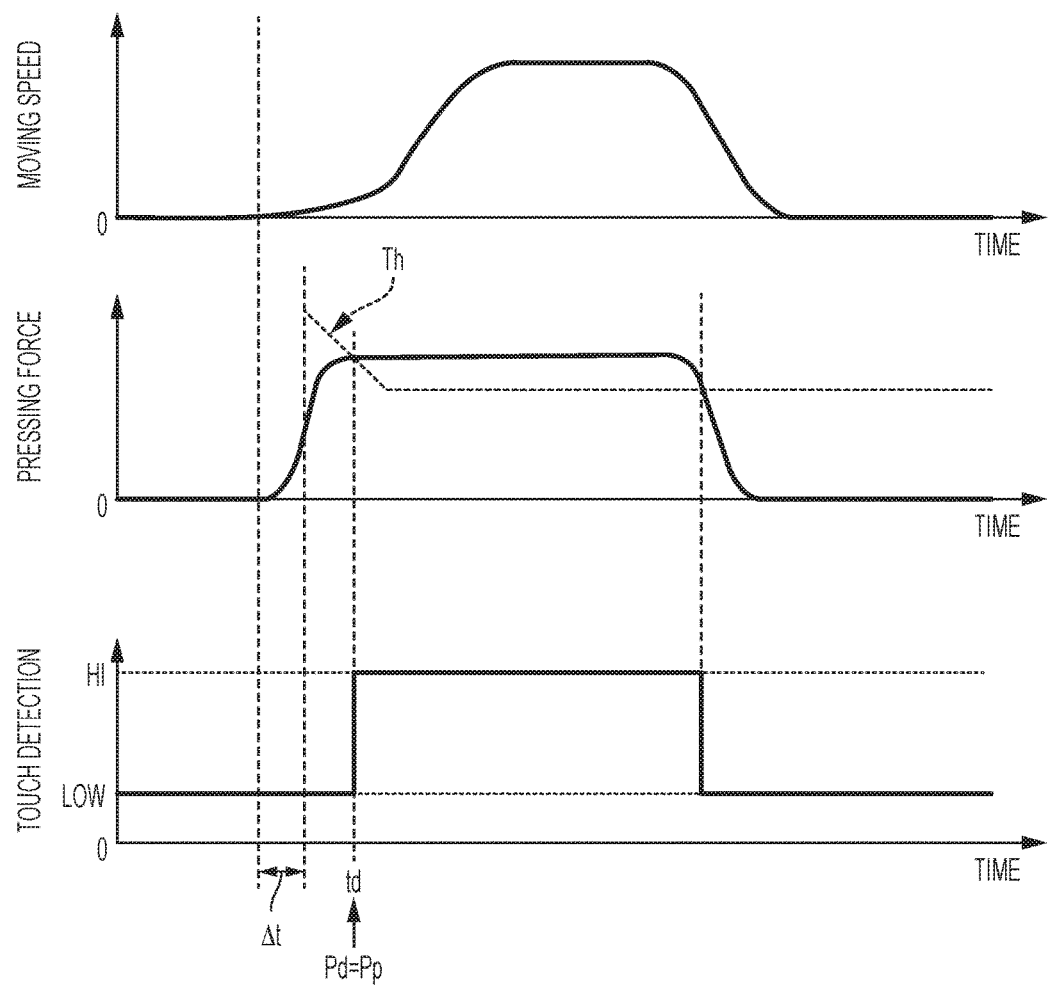
FIG. 4 illustrates waveform graphs of the moving speed, the pressing force, and the touch detection flag at performing the drag and drop operation of the touch input device according to the first embodiment of the present invention.

FIG. 3 is a flowchart of the drag and drop operation of the touch input device according to the first embodiment of the present invention. FIG. 4 illustrates waveform graphs of the moving speed, the pressing force, and the touch detection flag at performing the drag and drop operation of the touch input device according to the first embodiment of the present invention.

The control unit 20 detects, from an operation moving amount, that the operator touches the operation surface (S101). For instance, as illustrated in FIG. 4, the control unit 20 detects that the operation moving amount is increased from zero, and determines that touch detection is performed (S101: YES). Until it is determined that touch detection is performed, touch detection is continuously performed based on sequentially inputted operation moving amounts (S101: NO).

The control unit 20 executes a wait process for predetermined time Δt from an operation start timing (touch detection timing) (S102). During this period, the control unit 20 does not execute the process using a pressing force.

The control unit 20 detects that the wait process for predetermined time Δt is completed, and starts to compare a pressing force with threshold value Th (S103). As indicated by the thick dotted line in FIG. 4, the control unit 20 changes threshold value Th with time. More specifically, the control unit 20 sets a maximum value as the initial value of threshold value Th, and decreases threshold value Th from the maximum value with time (S104). After the elapse of a predetermined time, the control unit 20 stops decreasing threshold value Th. The control unit 20 continues to maintain a value at which the control unit 20 stops decreasing threshold value Th.

The control unit 20 detects that the pressing force is threshold value Th or more (S105: YES), and determines that the drag operation is performed, thereby executing a particular process according to the drag operation (S106). Here, the particular process is e.g., a process for setting the object set to the operation position so that the object is movable at the timing at which the pressing force is threshold value Th or more.

While the pressing force is less than threshold value Th (S105: NO), the control unit 20 continuously decreases threshold value Th and compares the pressing force with threshold value Th.

By performing such a process, as illustrated in FIG. 4, at the moving stage at which the moving speed before the operator places the finger in target drag position Pp is low, threshold value Th is set high. Thus, the pressing force which is increased to some extent by the operation in which the moving speed is low does not exceed threshold value Th. This can prevent the drag operation from being started in a state in which such a target drag operation is not started.

As illustrated in FIG. 4, when threshold value Th is decreased with time so that the finger of the operator reaches target drag position Pp, since the pressing force is continuously high, the pressing force is equal to or greater than threshold value Th in target drag position Pp. At detecting that the pressing force is equal to or greater than threshold value Th, the control unit 20 changes the touch detection signal from the Low state to the Hi state to start the drag operation.

With the structure and process of this embodiment, detection drag position Pd detected by the control unit 20 substantially coincides with target drag position Pp intended by the operator. Thus, the drag operation can be reliably detected to detect the true operation position with high accuracy.

As described above, with the structure and process of this embodiment, the drag operation is not started in the unintended operation position, can be reliably started in the intended operation position, and can be reliably prevented from being erroneously detected.

In the structure and process of this embodiment, since threshold value Th is stopped at the predetermined value, the drop operation which detects that the pressing force is less than threshold value Th can be precisely detected. For instance, as illustrated in FIG. 4, threshold value Th is decreased to be stopped and maintained at the certain level of value. For this, at the timing at which the operator moves the finger and then leaves the finger from the operation surface to lower the pressing force, threshold value Th is maintained at the certain level of value. This can detect the drop operation without an extreme state in which the pressing force is zero. Thus, the drop operation can be precisely detected to improve the operation sensitivity with respect to the drop operation.

The touch input device according to a second embodiment of the present invention will be described with reference to the drawings. The touch input device of this embodiment is the same as the touch input device of the first embodiment except that the setting process of threshold value Thv by the control unit 20 is different. Thus, only the points different from the touch input device of the first embodiment will be specifically described.

Figure 5:
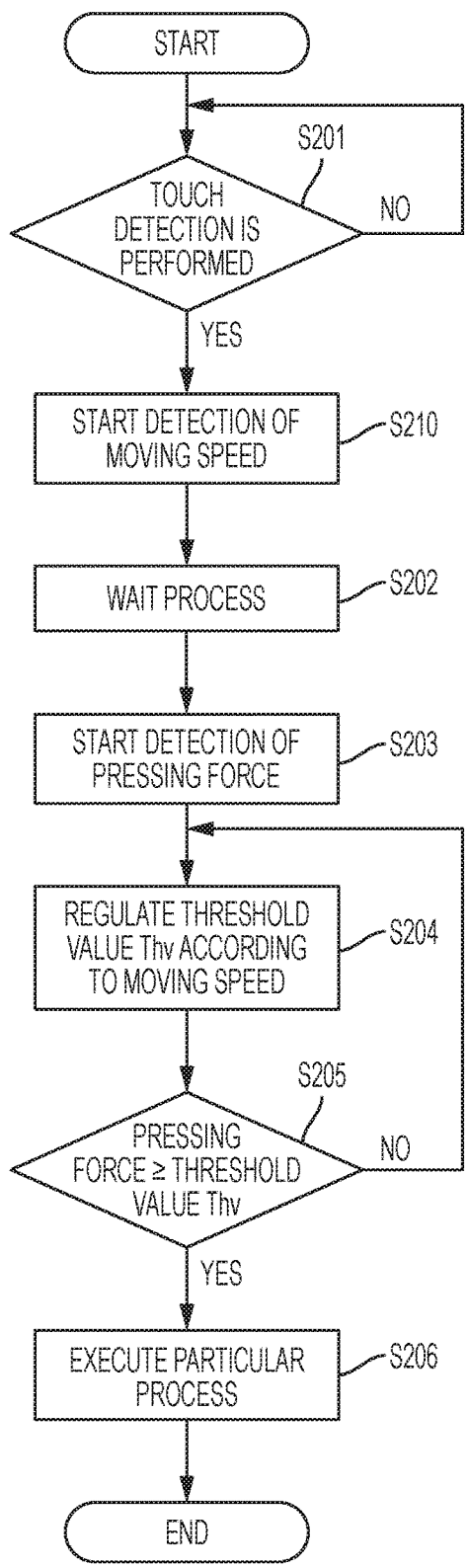
FIG. 5 is a flowchart of the drag and drop operation of the touch input device according to a second embodiment of the present invention.
Figure 6:
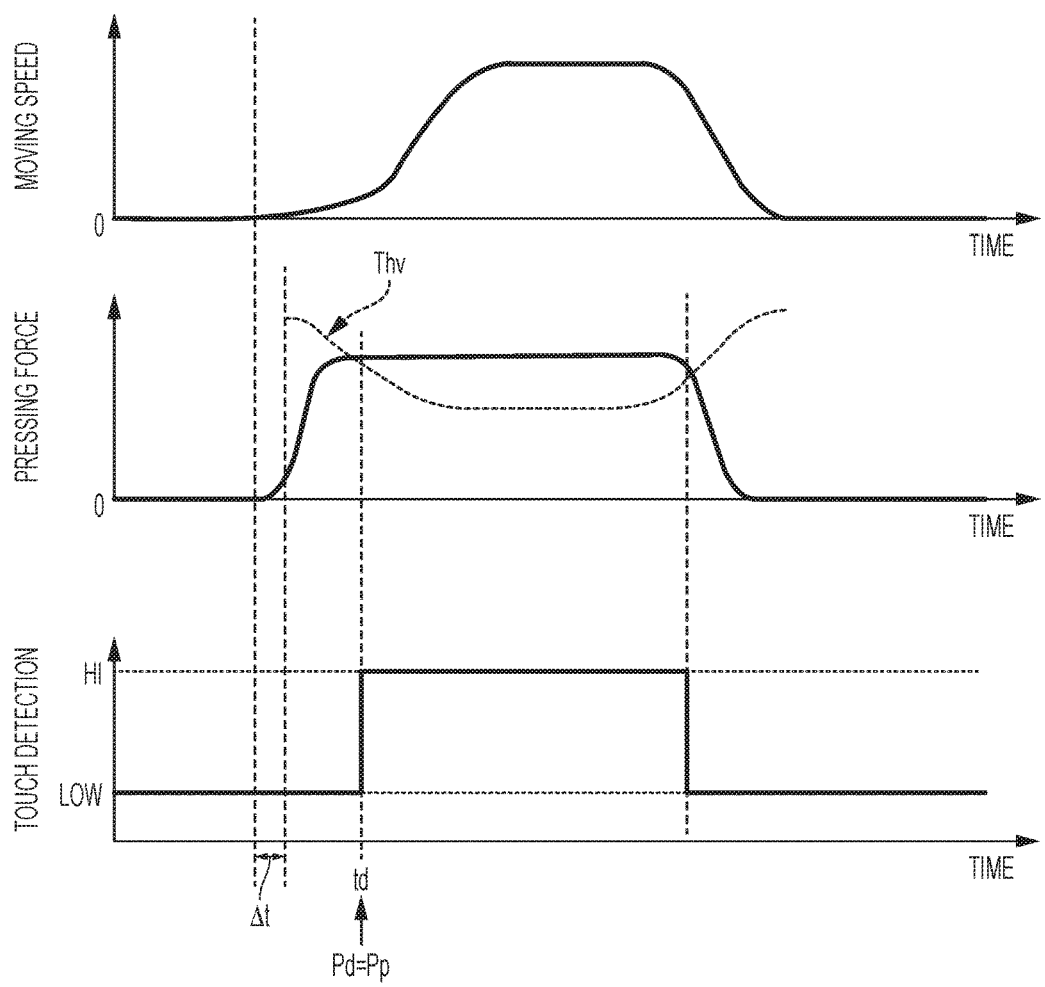
FIG. 6 illustrates waveform graphs of the moving speed, the pressing force, and the touch detection flag at performing the drag and drop operation of the touch input device according to the second embodiment of the present invention.
Figure 7:
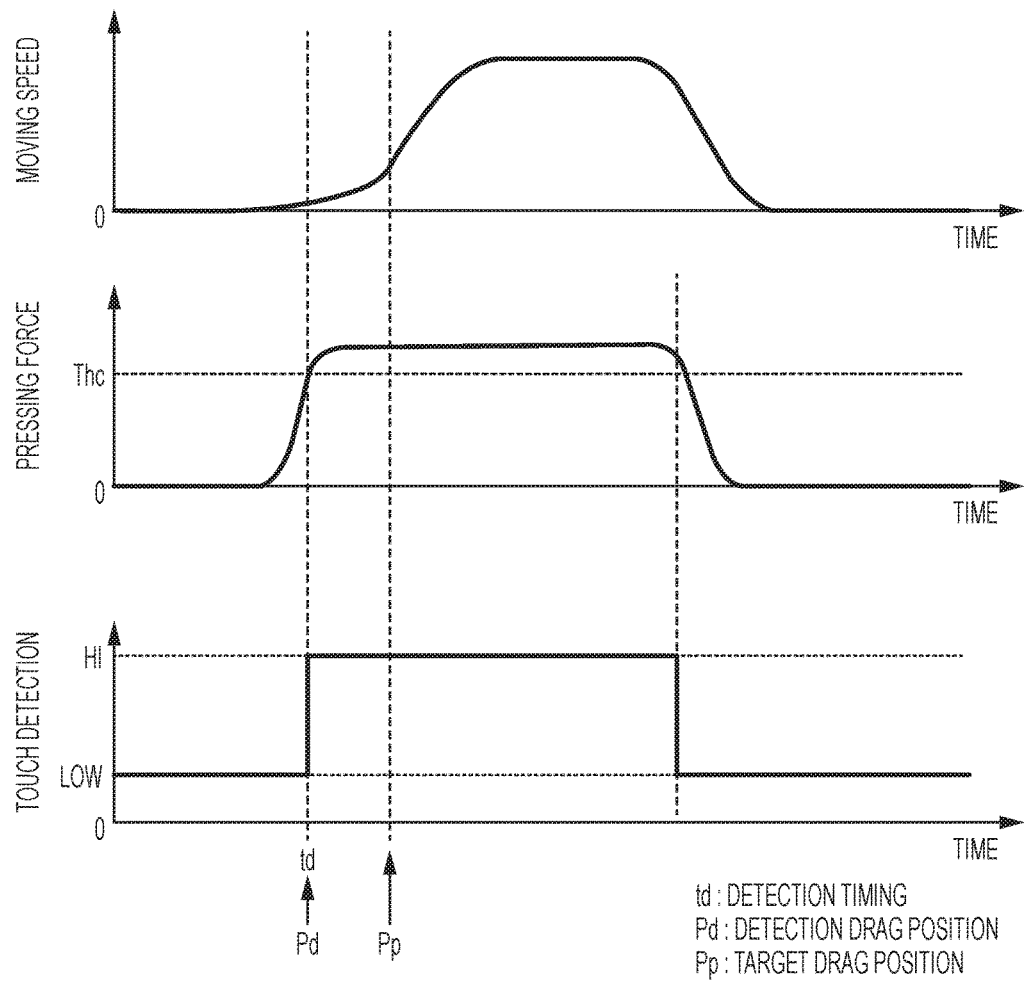
FIG. 7 illustrates waveform graphs for explaining the problems of a conventional structure and process.

FIG. 5 is a flowchart of the drag and drop operation of the touch input device according to the second embodiment of the present invention. FIG. 6 illustrates waveform graphs of the moving speed, the pressing force, and the touch detection flag at performing the drag and drop operation of the touch input device according to the second embodiment of the present invention.

The control unit 20 detects, from an operation moving amount, that the operator touches the operation surface (S201). For instance, as illustrated in FIG. 6, the control unit 20 detects that the operation moving amount is increased from zero, and determines that touch detection is performed (S201: YES). Until it is determined that touch detection is performed, touch detection is continued based on sequentially inputted operation moving amounts (S201: NO).

The control unit 20 detects an operation moving speed from the operation moving amount and the time difference between a plurality of timings for calculating the operation moving amount (S210).

The control unit 20 executes a wait process for predetermined time Δt from an operation start timing (touch detection timing) (S202). During this period, the control unit 20 does not execute the process using a pressing force.

The control unit 20 detects that the wait process for predetermined time Δt is completed, and starts to compare a pressing force with threshold value Thv (S203). As indicated by the thick dotted line in FIG. 6, the control unit 20 changes threshold value Thv with time.

More specifically, the control unit 20 sets a maximum value as the initial value of threshold value Thv, decreases threshold value Thv as the operation moving speed becomes higher, and increases threshold value Thv as the operation moving speed becomes lower (S204). Like the first embodiment, the control unit 20 previously sets the minimum value of threshold value Thv, and changes threshold value Thv between the maximum and minimum values.

The control unit 20 detects that the pressing force is equal to or greater than threshold value Thv (S205: YES), and determines that the drag operation is performed, thereby executing a particular process according to the drag operation (S206). Here, the particular process is e.g., a process for setting the object set to an operation position so that the object is movable at the timing at which the pressing force is threshold value Thv or more.

While the pressing force is less than threshold value Thv (S205: NO), the control unit 20 continuously regulates threshold value Th and compares the pressing force with threshold value Th.

By performing such a process, as illustrated in FIG. 6, at the moving stage at which the moving speed before the operator places the finger in target drag position Pp is low, threshold value Thv is set high. Thus, the pressing force which is increased to some extent by the operation in which the moving speed is low does not exceed threshold value Thv. This can prevent the drag operation from being started in a state in which such a target drag operation is not started. In addition, the true drag operation can be reliably detected to detect the true operation position with high accuracy.

As illustrated in FIG. 6, in the section in which the moving speed at which the finger is moved is high, threshold value Thv is set low. Thus, in the section in which the pressing force is high to some extent by the operation in which the moving speed is high, the pressing force can be prevented from being less than threshold value Thv. This can prevent the drop operation in the unintended position.

As illustrated in FIG. 6, when the operator lowers the moving speed of the finger in order to perform the drop operation, threshold value Thv becomes higher. In this case, the operator lowers the pressing force for the drop operation. Then, the pressing force is less than threshold value Thv, so that the drop operation can be detected. Thus, the drop operation can be precisely detected to improve the operation sensitivity with respect to the drop operation.

As described above, the wait control for predetermined time $\Delta t$ is performed, but can be eliminated.

The touch sensor preferably has the following structure. The touch sensor 10 has the piezoelectric film, the electrostatic capacity detection electrodes, and the piezoelectric detection electrodes. The electrostatic capacity detection electrodes and the piezoelectric detection electrodes are formed on both principal planes of the piezoelectric film.

The piezoelectric film is formed of uniaxially stretched poly-L-lactic acid (PLLA).

PLLA is a chiral polymer, and has a main chain of a helical structure. PLLA is uniaxially stretched for molecular orientation, thereby having piezoelectricity. Uniaxially stretched PLLA generates electric charge by pressing the planar surface of the piezoelectric film. The amount of electric charge generated is uniquely determined according to the amount of displacement in which the planar surface is displaced in the direction orthogonal to the planar surface by pressing.

Uniaxially stretched PLLA has a very high piezoelectric constant as compared with other polymers. Thus, PLLA can sense a pressing force at high sensitivity.

The stretching magnification is preferably approximately 3 to 8 times. Thermal treatment after stretching promotes crystallization of the extended chain crystal of polylactic acid, thereby improving the piezoelectric constant. Biaxial stretching can obtain the same effect as uniaxial stretching by making the stretching magnifications of the respective axes different. For instance, biaxial stretching eight times in an X-axis direction and two times in a Y-axis direction orthogonal to the X-axis direction can have almost the same piezoelectric constant as uniaxial stretching four times in the X-axis direction. Since a film which is simply uniaxially stretched is likely to be torn along the stretching axis direction, such biaxial stretching is performed for improving the strength to some extent.

PLLA exhibits piezoelectricity in the molecular orientation process by stretching, and is not required to be subjected to a poling process, unlike other polymers, such as PVDF, and piezoelectric ceramics. That is, the piezoelectricity of PLLA which is not a ferroelectric substance are not exhibited by ionic polarization, unlike other ferroelectric substances, such as PVDF and PZT, but are exhibited by the helical structure which is a molecular characteristic structure. Thus, PLLA exhibits no pyroelectric properties exhibited by other ferroelectric piezoelectric substances. Further, the piezoelectric constant of PVDF is changed with time, and in some cases, can be significantly lowered, whereas the piezoelectric constant of PLLA is very stable with time. Thus, PLLA can sense a pressing force at high sensitivity without being affected by the ambient environment.

PLLA has a very low relative permittivity which is approximately 2.5, and has a large piezoelectric output constant (=piezoelectric g constant, $g=d/\in^T$ where d is a piezoelectric constant, and $\in^T$ is a dielectric constant).

Here, from the above equation, the piezoelectric g constant of PVDF in which dielectric constant $\in_{33}^T=13\times\in_0$ and piezoelectric constant $d_{31}=25$ pC/N is $g_{31}=0.2172$ Vm/N. Meanwhile, the piezoelectric g constant of PLLA in which piezoelectric constant $d_{14}=10$ pC/N is converted into $g_{31}$, and from $d_{14}=2\times d_{31}$, $d_{31}=5$ pC/N, so that the piezoelectric g constant of PLLA is $g_{31}=0.2258$ Vm/N. Thus, PLLA in which piezoelectric constant $d_{14}=10$ pC/N can sufficiently obtain the same pressing amount detection sensitivity as PVDF. The present inventors have experimentally obtained PLLA in which $d_{14}=15$ to $20$ pC/N, which can sense a pressing force at very high sensitivity.

The electrostatic capacity detection electrodes and the piezoelectric detection electrodes are made of a material having light transmittance and conductivity. Specifically, as the electrostatic capacity detection electrodes and the piezoelectric detection electrodes, it is preferable to use either of an organic electrode mainly containing ITO, ZnO, silver nanowire, and polythiophene, and an organic electrode mainly containing polyaniline. By using these materials, the conductor pattern can have high light transmittance.

With such a structure, the electrostatic sensor 11C and the piezoelectric sensor 11P can be formed on the single piezoelectric film as a substrate, so that the touch sensor 10 can thus be thin.

DESCRIPTION OF REFERENCE SYMBOLS

Touch input device
10 Touch sensor
11C Electrostatic sensor
11P Piezoelectric sensor
12 Operation moving amount detection unit
13 Pressing force detection unit
20 Control unit
100 Housing
101 Operation surface
30 Display unit (display panel)
40 Storage unit

The invention claimed is:
1. A operation input device, comprising:
a display displaying a plurality of objects and having an operation surface such that a user can place his or her finger on the operation surface and move it along the operation surface with a varying amount of pressure;
a pressure sensor for generating a pressure signal indicative of the instantaneous pressure applied to the operation surface by the user's finger such that the value of the pressure signal at any given instant is indicative of the pressure applied to the operation surface at a corresponding instant;
a location sensor for generating a location signal indicative of the instantaneous location on the display where the user's finger applies pressure to the operation surface; and a controller which compares the instantaneous value of the pressure signal to a threshold value which decreases over time and, when the instantaneous value of the pressure signal exceeds the threshold, causes a drag operation to be performed on a particular one of the objects corresponding to the location on the operation surface where the pressure applied by the user exceeded the threshold value, the drag operation moving the particular object to a different positional location on the display.

2. The touch input device according to claim 1, wherein the threshold value is decreased to a non-zero value and then maintained at the non-zero value.

3. The touch input device according to claim 1, wherein the threshold value is decreased linearly.

4. The touch input device according to claim 1, wherein the control unit compares the instantaneous value of the pressure signal with the threshold only after a delay of a predetermined time from a point in time when the location signal indicates movement of the user's finger along the operation surface.

5. The touch input device according to claim 1, wherein the threshold value is decreased as a function of the speed at which the user's finger moves along the operation surface as indicated by the location signal.

6. The touch input device according to claim 1, wherein, after the controller begins the drag operation, it stops the drag operation when the instantaneous value of the pressure signal falls below a second threshold.

7. A method, comprising:
displaying a plurality of objects on a display having an operation surface;
moving a finger along the operation surface with a varying amount of pressure;
generating a pressure signal indicative of the instantaneous pressure applied to the operation surface by the user's finger such that the value of the pressure signal at any given instant is indicative of the pressure applied to the operation surface at a corresponding instant;
generating a location signal indicative of the instantaneous location on the display where the user's finger applies pressure to the operation surface; and
comparing the instantaneous value of the pressure signal to a threshold value which decreases over time and, when the instantaneous value of the pressure signal exceeds the threshold, causes an operation to take place with respect to a particular object one of the objects corresponding to the location on the operation surface where the pressure applied by the user exceeded the threshold value, the threshold value being decreased as a function of the speed at which the user's finger moves along the operation surface as indicated by the location signal.

8. The method according to claim 7, wherein the threshold value is decreased to a non-zero value and then maintained at the non-zero value.

9. The method according to claim 7, wherein the threshold value is decreased linearly.

10. The method according to claim 7, wherein the instantaneous value of the pressure signal is compared with the threshold only after a delay of a predetermined time from a point in time when the user's finger starts moving along the operation surface.

11. The method according to claim 7, wherein the operation to be performed on the object is a drag operation to move the particular object to a different positional location on the display.

12. The method according to claim 11, wherein, after the drag operation begins, it is stopped when the instantaneous value of the pressure signal falls below a second threshold.

13. A operation input device, comprising:
a display displaying a plurality of objects and having an operation surface such that a user can place his or her finger on the operation surface and move it along the operation surface with a varying amount of pressure;
a pressure sensor for generating a pressure signal indicative of the instantaneous pressure applied to the operation surface by the user's finger such that the value of the pressure signal at any given instant is indicative of the pressure applied to the operation surface at a corresponding instant;
a location sensor for generating a location signal indicative of the instantaneous location on the display where the user's finger applies pressure to the operation surface; and
a controller which compares the instantaneous value of the pressure signal to a threshold value which decreases over time and, when the instantaneous value of the pressure signal exceeds the threshold, causes an operation to take place with respect to a particular one of the objects corresponding to the location on the operation surface where the pressure applied by the user exceeded the threshold value, the threshold value being decreased as a function of the speed at which the user's finger moves along the operation surface as indicated by the location signal.

14. The touch input device according to claim 13, wherein the threshold value is decreased to a non-zero value and then maintained at the non-zero value.

15. The touch input device according to claim 13, wherein the threshold value is decreased linearly.

16. The touch input device according to claim 13, wherein the control unit compares the instantaneous value of the pressure signal with the threshold only after a delay of a predetermined time from a point in time when the location signal indicates movement of the user's finger along the operation surface.

* * * * *